United States Patent
Beekmann et al.

(10) Patent No.: US 9,997,922 B2
(45) Date of Patent: Jun. 12, 2018

(54) METHOD FOR FEEDING ELECTRICAL POWER INTO AN ELECTRICAL SUPPLY NETWORK

(71) Applicant: Wobben Properties GmbH, Aurich (DE)

(72) Inventors: Alfred Beekmann, Wiesmoor (DE); Kai Busker, Großefehn (DE)

(73) Assignee: Wobben Properties GmbH, Aurich (DE)

(*) Notice: Subject to any disclaimer, the term of this patent is extended or adjusted under 35 U.S.C. 154(b) by 214 days.

(21) Appl. No.: 14/868,696

(22) Filed: Sep. 29, 2015

(65) Prior Publication Data
US 2016/0087445 A1 Mar. 24, 2016

Related U.S. Application Data

(63) Continuation of application No. PCT/EP2014/057304, filed on Apr. 10, 2014.

(30) Foreign Application Priority Data

Apr. 22, 2013 (DE) .................. 10 2013 207 255

(51) Int. Cl.
H02J 7/34 (2006.01)
H02J 3/38 (2006.01)
(Continued)

(52) U.S. Cl.
CPC .............. *H02J 3/386* (2013.01); *H02M 7/04* (2013.01); *H02M 7/44* (2013.01); *Y02E 10/763* (2013.01)

(58) Field of Classification Search
CPC ........................................... H02J 3/386
See application file for complete search history.

(56) References Cited

U.S. PATENT DOCUMENTS 6,784,564 B1 9/2004 Zhang et al.
6,891,281 B2 5/2005 Wobben
(Continued)

FOREIGN PATENT DOCUMENTS

CN 100566069 C 12/2009
CN 102403732 A 4/2012
(Continued)

OTHER PUBLICATIONS

International Search Report for PCT Application No. PCT/EP2014/057304, dated Jun. 22, 2015, 4 pages.
(Continued)

*Primary Examiner* — Daniel Puentes
(74) *Attorney, Agent, or Firm* — Kilpatrick Townsend and Stockton

(57) ABSTRACT

The invention relates to a method for feeding electrical power of at least one wind turbine or of a wind farm into an electrical supply network having a network voltage and a network frequency, wherein the method is prepared for feeding in active electrical power and reactive electrical power and the fed-in active power can be adjusted on the basis of at least one network state by means of an active-power controller and/or the fed-in reactive power can be adjusted on the basis of at least one network state by means of a reactive-power controller and the active-power controller and/or the reactive-power controller can be changed according to type and/or parameterization.

16 Claims, 3 Drawing Sheets

(51) Int. Cl.
*H02M 7/04* (2006.01)
*H02M 7/44* (2006.01)

(56) References Cited

U.S. PATENT DOCUMENTS

| | | |
|---|---|---|
| 6,965,174 B2 | 11/2005 | Wobben |
| 7,462,946 B2 | 12/2008 | Wobben |
| 8,498,752 B2 | 7/2013 | Wells |
| 2008/0093856 A1 | 4/2008 | Stiesdal |
| 2010/0207456 A1 | 8/2010 | Lasseter et al. |
| 2011/0137474 A1* | 6/2011 | Larsen .................. F03D 7/0284 700/287 |
| 2013/0015660 A1 | 1/2013 | Hasselbaek et al. |

FOREIGN PATENT DOCUMENTS

| | | |
|---|---|---|
| DE | 10 2008 017715 A1 | 10/2009 |
| DE | 10 2008 039429 A1 | 2/2010 |
| EP | 2 275 674 A2 | 1/2011 |
| JP | 2001-054237 A | 2/2001 |
| JP | 2006-060961 A | 3/2006 |
| JP | 2007-060742 A | 3/2007 |
| JP | 2007-267495 A | 10/2007 |
| JP | 2011-517264 A | 5/2011 |
| JP | 2012-140902 A | 7/2012 |
| KR | 10-2004-0037185 A | 5/2004 |
| RU | 2 221 165 C2 | 1/2004 |
| TW | 201315083 A | 4/2013 |
| WO | 2003/030329 A1 | 4/2003 |
| WO | 2012/056564 A1 | 5/2012 |
| WO | 2014/040600 A2 | 3/2014 |
| WO | 2014/114648 A1 | 7/2014 |

OTHER PUBLICATIONS

International Written Opinion for PCT Application No. PCT/EP2014/057304, dated Jun. 22, 2015, 7 pages.
English Translation of Text of the First Office Action for Application No. 201480022469.3, dated Mar. 3, 2017, 3 pages.
English Translation of Japanese Examination Report dated Jun. 13, 2017, 7 pages.
Korean Application No. 1020157033084, Examination Report dated Sep. 28, 2017, 4 pages.
Canadian Office Action corresponding to Canadian Patent Application 2,908,612 dated Jul. 6, 2017, 3 pages.
Mohseni, M., et al., "Comparing Technical Connection Requirements for Large Wind Power Plants," Power and Energy Society General Meeting 2011, IEEE, Jul. 24, 2011, 8 pages.

* cited by examiner

METHOD FOR FEEDING ELECTRICAL POWER INTO AN ELECTRICAL SUPPLY NETWORK

CROSS-REFERENCES TO RELATED APPLICATIONS

This application is a continuation of International Application No. PCT/EP2014/057304, filed Apr. 10, 2014, which claims priority to German Application No. 10 2013 207 255.4, filed Apr. 22, 2013, the entire contents of both of which are incorporated herein by reference in their entirety for all purposes.

The present invention relates to a method for feeding electric power of at least one wind turbine or one wind farm into an electric power supply network. The present invention also relates to a wind turbine for feeding electric energy into an electric power supply network, and it relates to a wind farm which comprises multiple wind turbines for feeding electric energy into an electric power supply network.

A wind turbine is schematically represented in FIG. 1, and a wind farm is schematically represented in FIG. 2.

Wind turbines are generally known and are used today principally for feeding into an electric power supply network. In doing so, the wind turbine adapts the current to be fed in to the electric power supply network according to frequency and phase and taking into consideration the corresponding voltage. This is a basic requirement which must be fulfilled in any case and which is also fulfilled by known wind turbines. The same applies to a wind farm which has multiple wind turbines which collectively feed into an electric power supply network via a shared network connection point (PCC). In this case, the wind farm feeds into the electric power supply network.

It has already been recognized some time ago that it may not only be desirable to use the wind turbine or the wind farm to feed in as much electric power as possible into the power supply network, which is also referred to below simply as the 'network', but also to use the wind turbine or the wind farm for supporting the network. Patent applications U.S. Pat. No. 6,784,564, U.S. Pat. No. 6,891,281, U.S. Pat. No. 6,965,174 and U.S. Pat. No. 7,462,946 describe corresponding approaches. These applications already provide for varying the power to be fed in or the current to be fed in according to the level and/or according to the type as a function of a voltage or a frequency in the power supply network, in order to support the power supply network.

Today, the situation exists in many countries in which wind turbines account for an ever-greater proportion of the total capacity in a power supply network. As a result, the necessity of supporting the network via wind turbines is increasing. The dominance of wind turbines in the network and thus their influence are also increasing. Network support via the wind turbines or wind farms in the network may also be correspondingly effective.

The German Patent and Trade Mark Office has researched the following additional related art in the priority application for the present application: 'Technische Richtlinie Erzeugungsanlagen am Mittelspannungsnetz' (Technical Directive—Generation Facilities on the Medium-Voltage Network), BDEW (German Association of Energy and Water Industries), June 2008 edition, and 'Transmission Code 2007, Network and System Rules of the German Transmission System Operators', VDN (German Association of Network Operators), August 2007.

The object of the present invention is thus to address at least one of the aforementioned problems. In particular, an approach is to be provided which reflects or at least makes a contribution to the growing importance of wind turbines for supporting the network. In particular, network support is to be qualitatively and/or quantitatively improved via wind turbines or wind farms. At least one alternative approach is to be provided.

According to the present invention, a method is provided according to the claims. According to this method, electric power of at least one wind turbine or one wind farm is fed into an electric power supply network. The power supply network has a network voltage and a network frequency. The method is suitable for feeding in real electric power P as well as reactive electric power Q. The method and accordingly, the wind turbine or the wind farm which implements the method, is thus suitable for feeding in real electric power as well as for feeding in reactive electric power.

The fed-in real power P is adjustable as a function of at least one network state via a real power control. Thus, the real power is not firmly specified or fed in only as a function of the prevailing wind, but rather, it is adjusted as a function of at least one network state, such as the network frequency.

In addition or alternatively, the fed-in reactive power Q is not firmly specified, but is adjusted as a function of at least one network state, such as the network voltage.

It is thus provided that the real power control is variable according to type and/or in its parameterization. The dependence of the fed-in real power P on the at least one network state, for example, the network frequency, may thus be varied, even under constant wind conditions. For example, in one case, the real power is reduced with increasing frequency as soon as the network frequency is 0.1 percent above its nominal frequency, whereas in another case, such a reduction occurs only if the network frequency has exceeded its nominal value by 0.2 percent. The slope of the subsequent frequency-dependent reduction of the fed-in power may also be chosen differently.

The fed-in real power P may be a piecewise function of the network state, in particular the network frequency, via a linear relationship. This piecewise linear relationship may, for example, be changed into a nonlinear relationship, for example, via a hysteresis function, which is an example of a change in the type of the real power control. This may also be an analogous example of a change in the type of the reactive power control.

If, taking the above example, a piecewise linear relationship is the basis, according to an additional specific embodiment, its slope may be varied. This may be an example of the variation of the parameterization of the real power control, and analogously, the reactive power control.

In addition or alternatively, it is provided that the reactive power control is variable according to type and/or its parameterization. The relationship between the reactive power Q and the at least one state, for example, the network voltage, may preferably be varied in its type and/or in its parameterization. For examples of a variation according to type on the one hand, and in the parameterization on the other hand, reference is made to the general examples above for the variability of the real power control.

According to one specific embodiment, it is provided that the real power control for the real power to be fed in specifies a desired real power value as a function of at least one network state. The desired real power value is specified in particular as a function of the network frequency, as a function of a change in the network frequency and/or as a function of the network voltage. For this purpose, the change in the network frequency may be defined or detected via a gradient, i.e., via a partial derivative of the change in frequency as a function of time.

It is preferably provided that the reactive power control for the reactive power to be fed in specifies a desired reactive power value as a function of the at least one network state. Correspondingly, the desired reactive power value is thus in particular specified as a function of the network voltage, as a function of the network frequency and/or as a function of a change in the network frequency.

According to one specific embodiment, the real power control and, in addition or alternatively, the reactive power control, is changed as a function of the network sensitivity.

Here, a network sensitivity is understood to be the reaction of the network, in particular with respect to the shared network connection point, to a change in a variable which affects the network. The network sensitivity may be defined as the difference of a network reaction with respect to a difference of a network influence variable. In particular, in the present case, a definition is considered with respect to the real power fed in and the level of the network voltage. The following simplified formula may, for example, be defined for the network sensitivity NS:

$$NS = \frac{\Delta U}{\Delta P}$$

Here, $\Delta P$ denotes the change in the fed-in real power, i.e., the fed-in farm power, and $\Delta U$ denotes the resulting change in the network voltage U. These differences are formed over a very brief period of time, in particular in the range of one second or less, and a partial differential of the network voltage U may advantageously also be correspondingly formed as a function of the farm power P via the difference in the voltage with respect to the difference in the power, instead of this concrete formula. The change in the network frequency f is also considered as a network reaction. Another option for considering the network sensitivity would be via the formula:

$$NS = \frac{\Delta f}{\Delta P}$$

The network sensitivity is thus preferably used as a measure of the real power control to be chosen or to be changed and/or the reactive power control to be chosen or to be changed. If the network sensitivity changes at least significantly, the corresponding real power control and/or the corresponding reactive power control may be changed in type and/or parameterization. A change in the type corresponds to a change in the type of control, which is used synonymously here.

According to another specific embodiment, the real power control and/or the reactive power control is varied as a function of a short-circuit current ratio at the feed-in point.

According to another specific embodiment, the real power control and/or the reactive power control is varied as a function of a short-circuit current ratio at the feed-in point.

The short-circuit current ratio, which is also referred to as SCR (short-circuit ratio), refers to the ratio of the short-circuit power to the connection power. Here, short-circuit power may be understood to be the power which the relevant power supply network is able to provide at the network connection point under consideration, to which the wind turbine or the wind farm is connected, if a short circuit occurs at this network connection point. The connection power is the connection power of the connected wind turbine or the connected wind farm and thus in particular the nominal power of the generator to be connected or the sum of all nominal power outputs of the generators on the wind farm. The short-circuit current ratio is thus a criterion for the strength of the electric power supply network with respect to this network connection point under consideration. A strong electric power supply network with respect to this network connection point typically has a large short-circuit current ratio of, for example, SCR=10 or greater.

It has been recognized that the short-circuit current ratio may also provide a piece of information about the behaviour of the relevant power supply network at the network connection point. The short-circuit current ratio may also vary.

When installing a new wind farm or wind turbine, it is advantageous to take into consideration the short-circuit current ratio and to adapt the real power control and the reactive power control to it. It is preferably also recommended to measure the short-circuit current ratio at regular intervals also after the installation and commissioning of a wind turbine or a wind farm. The short-circuit power may, for example, be ascertained via information about the network topology with the aid of a simulation. The connection power may be ascertained simply via the knowledge of the installed wind turbines in a farm, and/or it may be ascertained via the measurement of the fed-in power at nominal wind.

A connection power for the provided calculation and consideration of the short-circuit current ratio is preferably defined and calculated as the sum of the nominal power output of all of the respective wind turbines which are currently available. Thus, in the event of a failure of a wind turbine, the connection power would change accordingly, at least temporarily. Thus, the short-circuit current ratio would also change, and a change in the real power control and/or the reactive power control could thereby be triggered.

According to another specific embodiment, it is provided that the connection power is calculated as the sum of the currently available power output on the wind farm taking into consideration the prevailing wind conditions, or that instead of the connection power of the wind farm, the sum of the currently available power outputs of the wind farm is used for calculating the short-circuit current ratio and/or is used as a change criterion for changing the real power control and/or the reactive power control. Therefore, the short-circuit current ratio is recalculated on this farm power thus ascertained, in order to determine this change condition, or a change criterion may also be derived directly from the power available in the farm.

For example, the switching condition may be one in which a parameter such as an amplification factor or the slope of a function is a function of the short-circuit current ratio or another criterion. For example, a proportional dependence could exist. As another example, which, however, is not final, a limit value may be determined and switched from one real power control to another real power control, according to the type, if the short-circuit current ratio or another criterion exceeds or falls below this limit value. The same applies to a change in the reactive power control.

A variation of the real power control and/or reactive power control preferably takes place via an external specification, for example, via an external signal which is input at a process computer which executes the real power control and/or the reactive power control. Such a specification is preferably made by a network operator which transmits such an external signal for this purpose.

One or multiple parameters may thereby also be changed, or a switch is made to another type or another kind of real power control or reactive power control. According to one specific embodiment, the desired new configuration of the respective real power control or reactive power control may also be transmitted. Thus, parameters to be changed may be transmitted, or even a new algorithm may be transmitted.

According to one embodiment of the present invention, it is provided that the fed-in real power and/or the fed-in reactive power is adjusted as a function of the network state via an adjustment function. In particular, such an adjustment function outputs the desired value of the real power to be fed in or the reactive power to be fed in as a function which depends on the network state. It is now provided that this adjustment function is varied or switched. For example, the slope of this adjustment function may be changed piecewise, or a function type other than the one previously used is used as an adjustment function. The real power control and/or the reactive power control is thereby varied according to type and/or in its parameterization. It is thus provided that functional relationships are varied. Such a variation may also take place as a function of the network sensitivity, a short-circuit current ratio, and/or an external specification.

Another specific embodiment provides that the fed-in real power is reduced with increasing network frequency as soon as the network frequency exceeds or reaches a threshold frequency value, and that the fed-in real power is further reduced until the frequency has reached an upper frequency value. A power reduction which is a piecewise function of frequency may thus be achieved. For this purpose, it is now provided that the slope of this power reduction is variable, in particular is a function of the aforementioned criteria. In addition or alternatively, it is provided that the frequency threshold is variable, and in addition or alternatively, the upper frequency value is to be variable. A frequency-dependent real power change may be defined via these values, and these values, i.e., the frequency from which a reduction is made, the frequency up to which a reduction is made, and/or the intermediate slope to be provided, may be varied.

Concerning this specific embodiment, it is also provided to use it analogously for a real power increase in the case of decreasing network frequency. The control behaviour is thus comparatively easily variable via these few parameters.

According to the present invention, a wind turbine is also provided which is suitable for implementing a method according to one of the described specific embodiments. In particular, such a wind turbine has a corresponding process computer and a corresponding frequency inverter which is suitable for carrying out such a reactive power feed-in and/or real power feed-in. In particular, the inverter used or the wind turbine used should be FACTS-capable.

In addition, a wind farm is provided which is suitable for implementing a method according to one of the described specific embodiments. It is suitable in particular for feeding in real electric power and reactive electric power into a power supply network and for using a variable real power control and/or a variable reactive power control for this purpose. This wind farm preferably feeds into the power supply network via a shared network connection point. It is also advantageous for the wind farm if it is FACTS-capable.

The present invention is explained by way of example below based on specific embodiments with reference to the accompanying figures.

FIG. 1 schematically depicts a wind turbine.

FIG. 2 schematically depicts a wind farm.

FIG. 3 schematically depicts a wind turbine which uses a method according to the present invention for feeding in, according to one specific embodiment.

Figure 1:
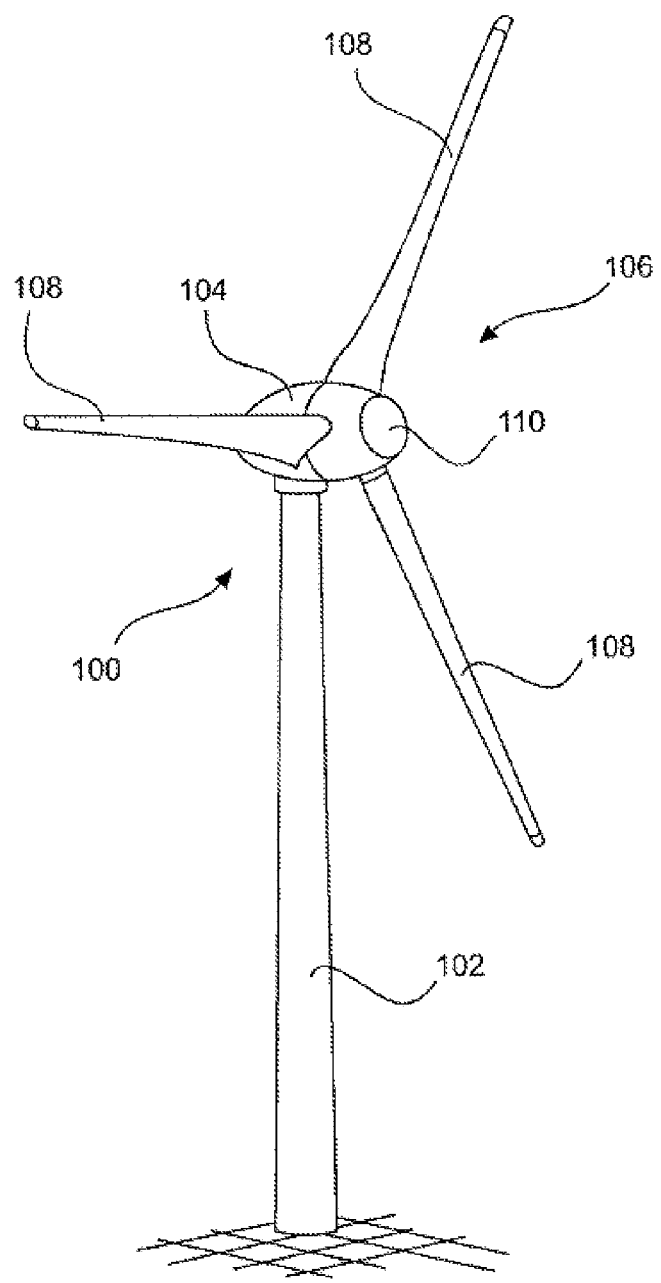

FIG. 1 shows a wind turbine 100 having a tower 102 and a nacelle 104. A rotor 106 having three rotor blades 108 and a spinner 110 are situated on the nacelle 104. In operation, the wind causes the rotor 106 to rotate, thus driving a generator in the nacelle 104.

Figure 2:
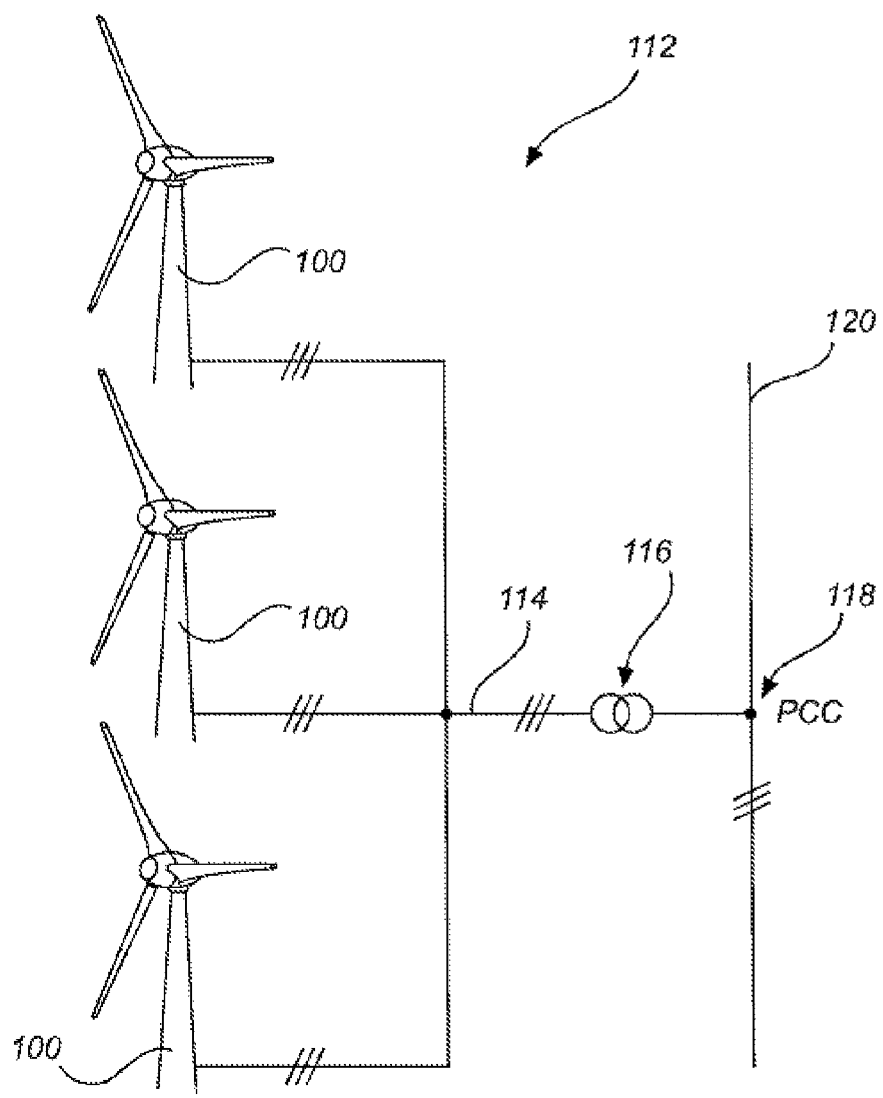

FIG. 2 shows a wind farm 112 having three wind turbines 100 by way of example, which may be identical or different. The three wind turbines 100 thus represent basically any number of wind turbines on a wind farm 112. The wind turbines 100 provide their power, in particular the generated current, via an electric farm network 114. The current and power generated by each of the wind turbines 100 is added up, and a transformer 116 is typically provided which steps up the voltage on the farm in order to feed into the power supply network 120 at the feed-in point 118, which is generally referred to as the PCC. FIG. 2 is only a simplified representation of a wind farm 112, which, for example, does not depict a controller, although a controller is of course present. The farm network 114 may, for example, also be designed differently, for example, with a transformer being present at the output of each wind turbine 100, just to name one other exemplary embodiment.

Figure 3:
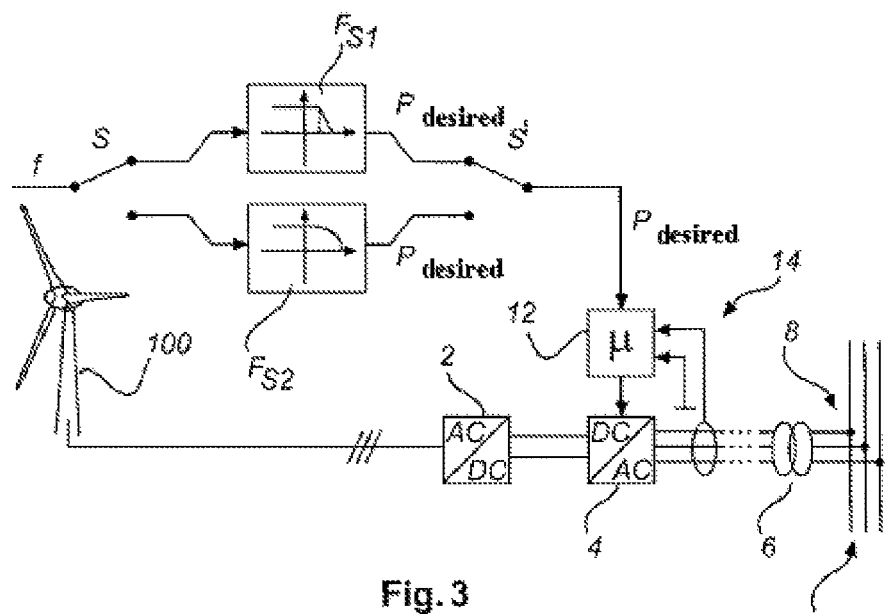

FIG. 3 illustrates a wind turbine 100 which, for example, supplies a three-phase generator current to a rectifier 2, which in turn is connected to an inverter 4 which generates a three-phase alternating current in order to feed it into an electric power supply network 10 at a feed-in point 8 (PCC) via a transformer 6. The control of the inverter 4 takes place via a control unit 12, which, for example, may be designed as one or multiple process computers. The control unit 12 also utilizes measured values relating to current and voltage according to the amplitude, frequency, and phase of its three-phase output current. For this purpose, a measurement feedback 14 is illustratively depicted.

The structure of FIG. 3 also illustrates that the control unit 12 takes into consideration a desired power value and will correspondingly control the inverter 4 in such a way that it outputs such a desired power P. The power P output by the inverter 4 is ideally identical to the desired power $P_{desired}$, so that $P=P_{desired}$. Furthermore, for the present cases, it may ideally be assumed that the generated power P is also the power which is fed into the network 10. In the present case, losses during the feed-in and dynamic processes between the desired power and the generated power are thus neglected.

The structure of FIG. 3 now illustrates that this desired real power value $P_{desired}$, and therefore ideally also the real power P to be fed in, are determined or specified as a function of the frequency f. For this purpose, two adjustment functions $F_{S1}$ and $F_{S2}$ are available, which are depicted here representatively for additional adjustment functions. A switch S and a switch S' operating together with it are now shown, which illustrate that, depending on the switch position, i.e., depending on the selection, the real power $P_{desired}$ may be specified via the first or second adjustment function $F_{S1}$ or $F_{S2}$. The selection option via the switch S or S' is in this respect only an illustration, and such a selection option may, for example, also be implemented in the control unit 12, so that the control unit 12 thus receives the network frequency f directly. In addition, such a switchover is preferably implemented in the process computer, for example, depending on a selected adjustment function, by the process computer accessing a corresponding data memory in which the desired adjustment function is stored.

FIG. 3 illustrates that an adjustment function for the real power to be fed in, and thus a real power control, are variable. Here, a real power control is shown by way of example as a function of the network frequency f. However, the illustration is also intended to represent a controller as a function of a different network state, for example, the network voltage or a change in the network frequency. Analogously, a reactive power control which is a function of a network state may also be implemented as illustrated and described. Here as well, different network states may be used as an input value for the reactive power control.

Figure 4:
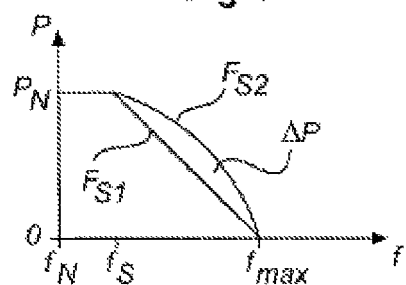
FIG. 4 shows two different kinds of adjustment functions illustratively and by way of example for adjusting the power P as a function of the network frequency.

The chosen adjustment functions $F_{S1}$ and $F_{S2}$ illustrated in FIG. 3 are shown in FIG. 4 by way of example. FIG. 4 thus shows by way of example two adjustment functions $F_{S1}$ and $F_{S2}$. Both adjustment functions show the specified dependence of the real power P as a function of the network frequency f. At a nominal network frequency $f_N$, the power P has its nominal value $P_N$. In this respect, FIG. 4 is shown for the situation in which the prevailing wind conditions make the feed-in at the nominal power $P_N$ at all possible. If this is not possible, and it is possible only to feed in less power because, for example, the wind is too weak, the relationship shown in FIG. 4 is also applicable to this lower available power by, for example, using this power instead of the nominal value $P_N$ shown.

The real power P initially remains unvaried with increasing frequency f, until the frequency f has reached the threshold frequency value $f_S$. Then, the real power P is reduced with additionally increasing frequency. This reduction now occurs differently depending on the selected real power control and thus depending on the selected adjustment function. The first adjustment function $F_{S1}$ shows a linear curve in which the real power P then decreases linearly to 0 from the threshold frequency value $f_S$ up to the maximum frequency value $f_{max}$. According to the other adjustment function shown, a curve is provided in terms of a quadratic function having a negative sign. This function also reduces the real power P from the threshold frequency $f_S$ up to the maximum frequency $f_{max}$ to the power value of 0. However, the differently chosen curve provides the option of a higher power feed-in, which is illustrated by the gap between these two adjustment functions $F_{S1}$ and $F_{S2}$, which is labelled in FIG. 4 as ΔP. The different adjustment functions differ in this respect only in one section, and according to the example shown, the adjustment function may in this respect be changed piecewise. The change takes place preferably as a function of a network sensitivity or a specification of a network operator, just to name two examples.

It has thus been recognized that, depending on the situation which, for example, may be assessed by the network operator, or which results from the network sensitivity, a varied real power control may be chosen which enables a higher power feed-in.

Figure 5:
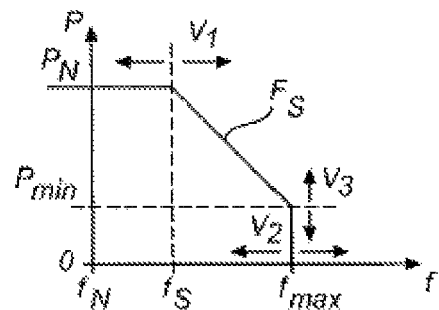
FIG. 5 shows an adjustment function by way of example and illustratively for adjusting the power P as a function of the network frequency f, having variation options.

Instead of a variation via the choice of an entirely different adjustment function, for example, a linear function on the one hand and a quadratic function on the one hand, as illustrated in FIG. 4, it is also considered to leave the adjustment function $F_S$ basically unvaried, but to vary one or multiple parameters. This is illustrated in FIG. 5, and it is pointed out that the variation via the changing of parameters illustrated in FIG. 5 may also be carried out by switching between differently parameterized adjustment functions. In this respect, reference is made to the explanation for FIG. 3, which is also applicable in this case. However, on the other hand, each of the corresponding parameters may also be adjusted in the control unit or another process computer. In any case, such a change is considered, for example, via an external specification by a network operator or the evaluation of a network sensitivity, just to name two examples.

In this respect, FIG. 5 illustrates a parameter change in an adjustment function $F_S$. This adjustment function $F_S$ basically corresponds to the adjustment function $F_{S1}$ in FIG. 4, the adjustment function $F_S$ in FIG. 5, however, initially decreasing linearly from the threshold frequency value $f_S$ up to the maximum frequency value $f_{max}$ to a minimum power value $P_{min}$ which is greater than 0. When this maximum frequency $f_{max}$ is reached, or immediately after it is exceeded, the power P then falls to 0. For this example provided, the first variation option $v_1$ that results is the variation of the threshold frequency $f_S$ at which the variation, i.e., the reduction of the power, starts, relative to an additionally increasing frequency f. As a second variation option $v_2$, the option exists of varying the maximum frequency value $f_{max}$. Finally, the minimum power $P_{min}$ may also be varied, which is illustrated as variation option 3 $v_3$. Apart from that, the slope of the linearly decreasing range of the adjustment function $F_S$ is also varied via this third variation option $v_3$.

FIGS. 3 through 5 illustrate the provided variation of the power controls as a function of a network state by way of example by the variation of the real power control as a function of the network frequency as a network state. However, in the described manner or in an analogous manner, it is also considered to vary the real power control, and/or that instead of the frequency as the network state and in addition to it, a change in frequency or a network voltage is used.

The invention claimed is:

1. Method for feeding electric power of at least one wind turbine or one wind farm into an electric power supply network having a network voltage and a network frequency, the method comprising:
    feeding real electric power and reactive electric power into the electric power supply network;
    adjusting the fed-in real electric power as a function of at least one first network state via a real power control and adjusting the fed-in reactive electric power as a function of at least one second network state via a reactive power control, wherein the first network state and the second network state include at least one of the network voltage or the network frequency;
    adjusting a type and/or parameterization of the real power control based on the at least one first network state to provide an adjusted real power control and adjusting a type and/or parameterization of the reactive power control based on the at least one second network state to provide an adjusted reactive power control; and
    adjusting the fed-in real electric power as a function of the at least one first network state via the adjusted real power control and adjusting the fed-in reactive electric power as a function of the at least one second network state via the adjusted reactive power control.

2. Method according to claim 1, wherein the real power control for the real electric power is based on a desired real power value as a function of the network frequency, as a function of a change in the network frequency and/or as a function of the network voltage.

3. Method according to claim 1, wherein the reactive power control for the reactive electric power is based on a desired reactive power value as a function of the network voltage and/or as a function of the network frequency and/or as a function of a change in the network frequency.

4. Method according to claim 1, wherein the real power control and/or the reactive power control is varied as a function of:
- a network sensitivity,
- a short-circuit current ratio, and/or
- an external specification, in particular via an external signal.

5. Method according to claim 1, wherein the fed-in real electric power and/or the fed-in reactive electric power is adjusted via an adjustment function, and the real power control and/or the reactive power control is varied according to type and/or its parameterization by varying or switching the respective adjustment function.

6. Method according to claim 1, wherein the fed-in real electric power is reduced with increasing network frequency as soon as the network frequency has exceeded a threshold frequency value and until it has reached an upper frequency value, and a slope of the network frequency-dependent reduction and/or the threshold frequency value and/or the upper frequency value are variable.

7. Wind turbine for feeding electric power into an electric power supply network, wherein the wind turbine is suitable for feeding electric power into the electric power supply network according to the method of to claim 1.

8. Wind farm for feeding electric power into an electric power supply network, wherein the wind farm is suitable for feeding electric power into the electric power supply network according to the method of to claim 1.

9. Method according to claim 2, wherein the reactive power control for the reactive electric power is based on a desired reactive power value as a function of the network voltage and/or as a function of the network frequency and/or as a function of a change in the network frequency.

10. Method according to claim 2, wherein the real power control and/or the reactive power control is varied as a function of:
- a network sensitivity,
- a short-circuit current ratio, and/or
- an external specification, in particular via an external signal.

11. Method according to claim 3, wherein the real power control and/or the reactive power control is varied as a function of:
- a network sensitivity,
- a short-circuit current ratio and/or
- an external specification, in particular via an external signal.

12. Method according to claim 2, wherein the fed-in real electric power and/or the fed-in reactive electric power is adjusted via an adjustment function, and the real power control and/or the reactive power control is varied according to type and/or its parameterization by varying or switching the respective adjustment function.

13. Method according to claim 3, wherein the fed-in real electric power and/or the fed-in reactive electric power is adjusted via an adjustment function, and the real power control and/or the reactive power control is varied according to type and/or its parameterization by varying or switching the respective adjustment function.

14. Method according to claim 2, wherein the fed-in real electric power is reduced with increasing network frequency as soon as the network frequency has exceeded a threshold frequency value and until it has reached an upper frequency value, and a slope of the network frequency-dependent reduction and/or the threshold frequency value and/or the upper frequency value are variable.

15. Method according to claim 4, wherein the fed-in real electric power is reduced with increasing network frequency as soon as the network frequency has exceeded a threshold frequency value and until it has reached an upper frequency value, and a slope of the network frequency-dependent reduction and/or the threshold frequency value and/or the upper frequency value are variable.

16. Method according to claim 5, wherein the fed-in real electric power is reduced with increasing network frequency as soon as the network frequency has exceeded a threshold frequency value and until it has reached an upper frequency value, and a slope of the network frequency-dependent reduction and/or the threshold frequency value and/or the upper frequency value are variable.

* * * * *